June 21, 1949.  F. E. HARRIS ET AL  2,473,682
ANGLE MEASURING MECHANISM
Filed April 26, 1946                                2 Sheets-Sheet 1
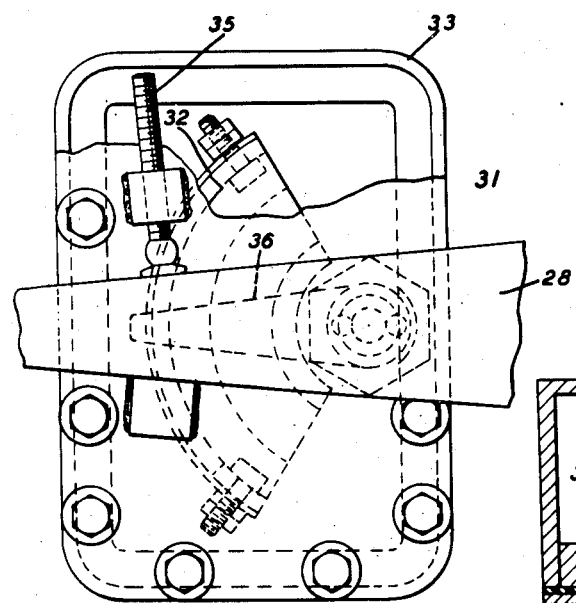
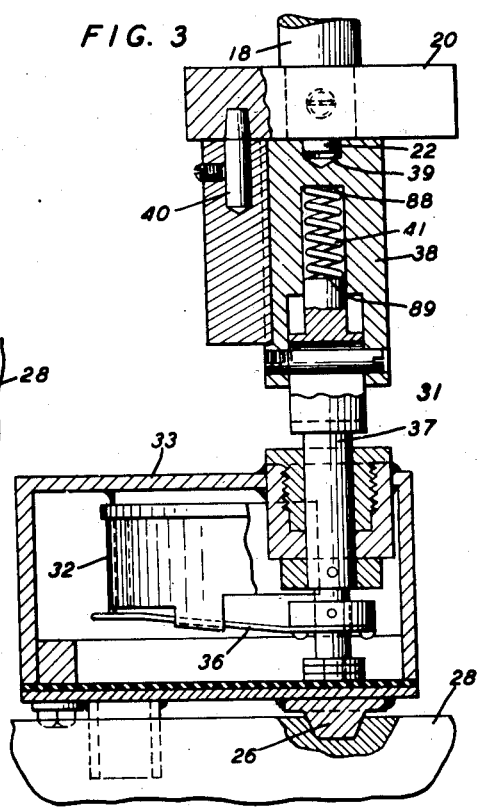
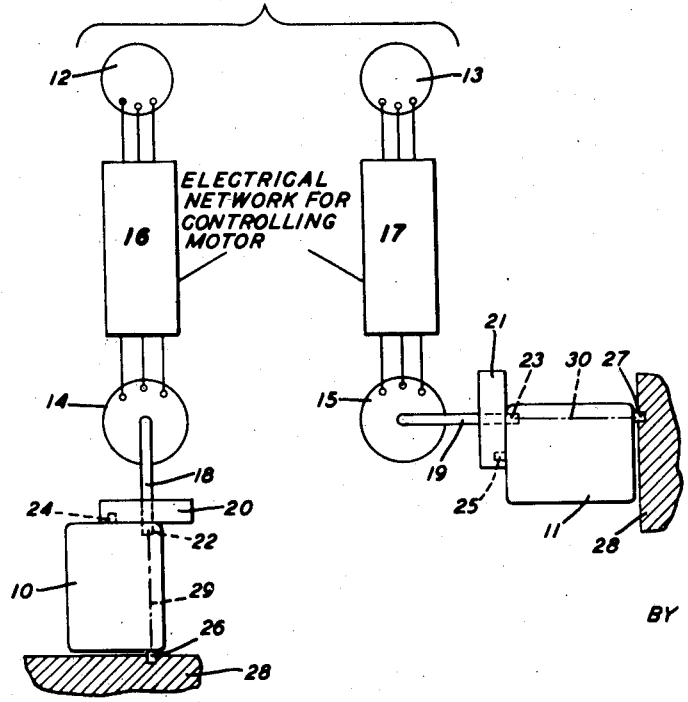
INVENTORS
F.E. HARRIS
A.S. HEGEMAN, JR.
D.H. MITCHELL
H.N. SNOOK
BY W.C. Parnell
ATTORNEY

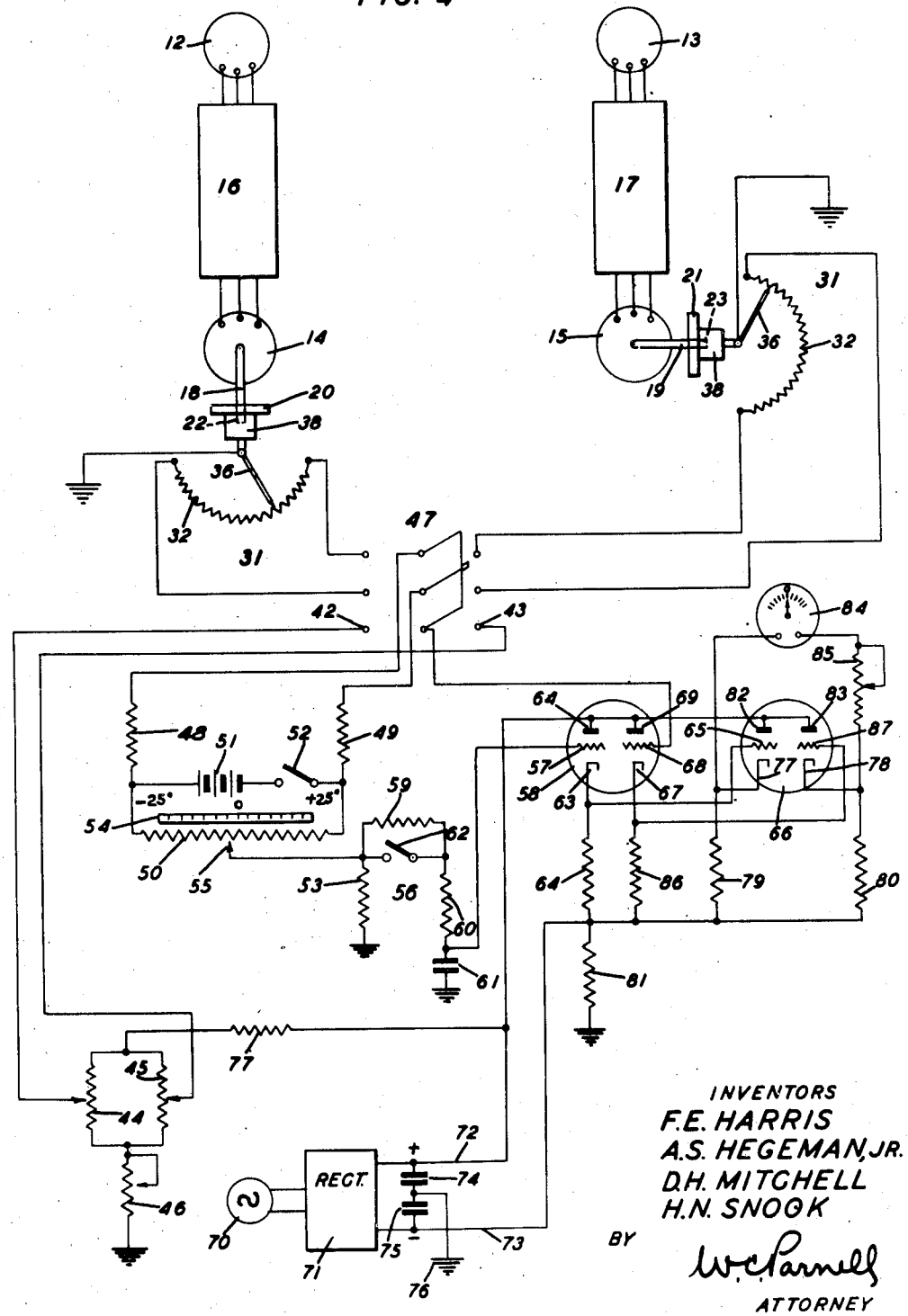

UNITED STATES PATENT OFFICE 2,473,682

ANGLE MEASURING MECHANISM

Fred E. Harris, Haverhill, Mass., and Andrew S. Hegeman, Jr., Glen Ridge, Donald H. Mitchell, Cranford, and Harry N. Snook, Maywood, N. J., assignors to Western Electric Company, Incorporated, New York, N. Y., a corporation of New York Application April 26, 1946, Serial No. 665,126

5 Claims. (Cl. 177—311)

This invention relates to angle measuring mechanisms for systems wherein an angularly adjustable member is variously positioned in accordance with the magnitude and polarity of an electrical potential.

In such systems there usually must be a definite, known relation between any change in the signal potential and the response of the driven member to that change. In one well-known type of such system, as disclosed for example in Patents 1,703,280 and 1,988,458 to Minorsky, the driven member is constantly hunting for its proper position under the control of the signal potential and its actual position at any instant will, of course, depend on the electrical and mechanical time constants of the system.

The object of this invention is to determine the relation between the driving potential and the position of the driven member of such a system to a high degree of accuracy.

According to the general features of the invention, the driven member, the response of which is to be calibrated, is removed from the system and replaced by an electrical potentiometer. This potentiometer is designed to impose on the system exactly the same mechanical load as the member it replaces and to be operated by the system to select potentials corresponding to the positions which the member itself would assume under the control of the same applied signal. The potentials obtained in this manner are suitably averaged and balanced in a null indicator having a second potentiometer calibrated directly in terms of the position of the driven member which is being simulated.

These and other features of the invention will be clearly understood from the following detailed description and the accompanying drawing in which Fig. 1 is a diagrammatic representation of a typical system having driven members the responses of which are to be measured;

Figs. 2 and 3 show the mechanical construction of the potentiometers used to simulate the load imposed on the system by the driven members; and Fig. 4 shows the system of Fig. 1 with potentiometers mounted in the positions of the driven members and connected to the circuits required for measuring the responses of the members.

In the known type of system shown in Fig. 1, the driven members 10 and 11 may be a rudder and an elevator, respectively, of an aircraft or guided missile, or the corresponding parts of a submarine craft or device, or any other members which are to be positioned according to the signals generated or received by the signal devices 12 and 13. The outputs of these devices drive the motors 14 and 15 through complex electrical networks 16 and 17, each of which may be of the general type shown in the Minorsky patents referred to above or of the type shown in the copending application of H. K. Dunn, Serial No. 491,794, filed June 22, 1943, for a Signal controlled steering system.

The motor shafts 18 and 19 extend through driving discs 20 and 21 and terminate in stubs 22 and 23 which engage recesses in the driven members 10 and 11, respectively. These members are also provided with driving pins 24 and 25 for engaging holes in the discs and with lower pivots 26 and 27 which engage bearing recesses in the stationary structure 28 of the mechanism so that the members are rotated or oscillated about their axes 29 and 30 by the motors 14 and 15 under the control of the outputs of the signal devices 12 and 13.

In Fig. 4 the members 10 and 11 have been replaced by the potentiometers 31, 31, each of which may be of the construction shown in detail in Figs. 2 and 3. In these potentiometers the resistance element 32 is enclosed in a housing 33 which is properly oriented and secured to the stationary structure 28, as for example, by means of a set screw 35. The wiper arm 36 is attached to a rotary shaft 37 which is in turn connected to the motor driven member 20 or 21 through the load adjusting device 38. As in the case of the driven members 10 and 11, this device has a recess 39 and a driving pin 40 engaging the member 20, and is further provided with a spring 41 for increasing the load produced on the motor by the potentiometer to the same value as the load imposed by the displaced member.

In the structure shown the spring 41 is compressed between its seat 88 in the upper part of the device 38 and the end 89 of the potentiometer shaft 37, thereby forcing the potentiometer downwardly against the stationary structure 28 and the outer casing of the device 38 upwardly against the disc 20 to increase the friction at the pivot 26 and the bearings (not shown) of the shaft 18. The spring may be selected initially to produce the force required or this force may be adjusted in various ways as by deforming the spring or by inserting washers of the required thickness between it and the end 89 of the shaft. By so designing or adjusting the potentiometer structure that it imposes the same load on the system as the member it replaces, the overall mechanical time constant of the system remains unchanged and the variations in the voltage selected by the potentiometers are an accurate representation of the motiton of the driven member.

With two such potentiometers in place as just described, the wiper arms 36 are grounded and the ends of the resistance elements are connected to opposite sides of a double throw switch 47 as shown. The lower contacts 42 and 43 of the switch are connected through adjustable portions of the potentiometers 44 and 45 and a common adjustable resistor 46 to ground. With the switch 47 closed in either position, the connected potentiometer element 32 and the fixed resistors 48 and 49 constitute two adjacent arms of a bridge, the other two arms of which are formed by the potentiometer 50. Operating potential is applied across one diagonal of the bridge from a suitable source 51 through a switch 52, and for any position of the wiper arm 36 a balance is obtained by adjusting the contact arm 55 until there is no potential across the grounded resistor 53. The potentiometer 50 is provided with a scale 54 having a zero mark opposite the point at which the contact arm 55 must be set to balance the bridge when the member 20 is positioned so that the normally associated driven member is exactly in its zero position. The scale 54 is calibrated in suitable units, such as degrees, corresponding to the different angular positions of the wiper arm 36 which in turn correspond to the positions which the driven members 10 and 11 would assume under the same conditions of operation.

Since the signals from the sources 12 and 13 are ordinarily varying constantly in amplitude and polarity, and the driven members 10 and 11 are constantly hunting for their proper positions, any determination of the relation between the input signal and the position assumed by the driven member must be on the basis of an integrated or averaged reading over some known time interval. For this purpose an averaging or integrating network 56 of a well-known type is interposed between the resistor 53 and the input circuit of the amplifier tube 58. From the configuration of the network it is apparent that only a portion of the potential existing across the resistor 53 will be applied to the tube 58 and that the relative magnitude of this portion will be determined by the impedance of the resistors 59 and 60 and the condenser 61. By proper choice of these impedances, the network may be designed in accordance with known practice to give the circuit any desired time constant. In one case, for example, with the switch 62 closed to bypass the resistor 59, the network operates to average variations of the order of 3 cycles per second whereas with the switch open as shown, the time constant is increased so that the variations are integrated over an interval of about 8 seconds.

In the triode tube 58 the left-hand section, comprising the grid 57, the cathode 63 and the plate 64, is a conventional amplifier stage cathode coupled by the resistor 64 to the grid 65 of the tube 66. The right-hand section of the tube 58, comprising the cathode 67, the grid 68 and the plate 69, serves only as a balancing device as explained below.

Power is supplied to the tubes 58 and 66 from the source 70 through a conventional rectifier 71, having its output leads 72, 73 balanced with respect to ground for signal potentials by means of serially connected condensers 74, 75 and the ground connections 76. The resistor 77 provides paths to ground from the positive lead 72 through the potentiometers 44 and 45, and with a proper setting of resistor 46 the potentiometers may be adjusted individually to produce any desired static bias on the grid 68 in either position of the switch 47. This adjustment is very useful in setting up the apparatus in view of the difficulty of mounting the potentiometers 31 with the required degree of accuracy of orientation. With this circuit the potentiometers are clamped in place in approximately their proper positions and any inaccuracy in the mounting is compensated by adjusting the potentiometers 44 and 45, so that when the wiper arms 36 of the potentiometers 31 are exactly in their neutral positions, the bias on the grid 68 of the tube 58, in either case, is of the proper value to give a zero reading on the meter.

The double triode tube 66 has its cathodes 77 and 78 connected to ground through individual resistors 79 and 80 and a common resistor 81 and its plates 82 and 83 connected directly to the lead 72 of the power supply. The meter 84 is connected in series with a sensitivity adjusting resistor 85 to indicate the magnitude and polarity of any difference in potential between the cathodes 77 and 78. With no signal potential on the grid 57, the circuit constants are such that the potentials across resistors 64 and 86 are equal, the grids 65 and 87 of the tube 66 are biased equally and, with the symmetrical circuit comprising four tubes connected in tandem pairs as shown, there will be no potential across the terminals of the meter 84. This balance will not be disturbed by variations in the voltage of the power source 70 since such variations will affect both sections of the tubes 58 and 66 equally and therefore will produce no difference in potential between the cathodes 77 and 78.

From the foregoing description it will be understood that with the signal sources 12 and 13 supplying signals to the system, and the motors 14 and 15 driving the potentiometers 31, 31, a check on the accuracy of the response of the system to the signals is readily obtained. With switch 52 closed to energize the bridge, the switch 47 may be closed first to the left to connect in as part of the bridge the potentiometer associated with the network 16. The switch 62 may be open or closed, depending on the time constant desired. In the particular circuit illustrated, a simple sinusoidal signal is first introduced and all the necessary adjustments of the system are made with the switch 62 closed. Then complex signals, of the type to which the driven members 10 and 11 are to respond, are supplied from the sources 12 and 13 at predetermined amplitudes and frequencies and for each such signal the switch 47 is operated to connect the potentiometers into the circuit in succession. In each operated position of the switch, the arm 55 of the potentiometer 50 is adjusted until the meter 84 indicates a balance and the corresponding reading is taken from the scale 54. These readings are then compared in each case with the theoretical deflections of the driven member to determine the accuracy of its response.

It will be understood that the system shown and described is merely illustrative, and that it may be modified in various ways within the scope of the following claims.

What is claimed is:

1. In a system wherein a driven member is variously positioned in accordance with variations in a signal applied to the system, means for establishing the relation between said signal and the response of the member, comprising means mounted in the system in place of the driven member and adapted to impose on the system the same mechanical load as the member and to produce a potential varying in magnitude and polarity to represent the motion of the driven member under the control of the signal, a potentiometer calibrated in terns of the displacement of the member by the signal connected to the potential producing means to form a bridge circuit and a contact on the potentiometer for balancing the bridge circuit.

2. In a system where a rotatable driven member is variously positioned in accordance with the magnitude and polarity of a signal potential, means for establishing the relation between said potential and the response of the member, comprising a null indicator having a bridge circuit including a source of potential, a first potentiometer adapted to be mounted mechanically in the system in place of the member to simulate the load produced on the system by the member and a second potentiometer calibrated in terms of displacement of the member from a predetermined position, a movable contact on the first potentiometer adapted to be positioned in accordance with the response of the member to the signal potential, and a manually movable contact on the second potentiometer for balancing the bridge circuit.

3. In a system wherein a plurality of similar rotatable driven members are each variously positioned in accordance with the varying magnitude and polarity of a signal potential, means for establishing the relations between said potential variations and the positions assumed by the members comprising a null indicator having a bridge circuit including a first potentiometer adapted to be mounted in the system in place of any one of the members to simulate the load produced on the system by said one member, a second potentiometer calibrated in terms of displacement of the members, a movable contact on the first potentiometer adapted to be positioned in accordance with the response of the member to the signal potential, a manually movable contact on the second potentiometer for balancing the bridge circuit, and means for selectively connecting the first potentiometer electrically into the bridge circuit from any one of its positions in the system.

4. A system according to claim 1 having an amplifier, a meter responsive to the output of the amplifier for indicating unbalance potentials in the bridge circuit and a network of adjustable time constant interposed between the bridge circuit and the amplifier.

5. A system according to claim 1 including two triode vacuum tubes, means for applying equal plate voltages and static grid biases to the tubes, means for impressing on the grid of one of the tubes the unbalance potentials developed in the bridge circuit and a device for indicating differences in potential between the cathodes of the tubes.

FRED E. HARRIS.
ANDREW S. HEGEMAN, Jr.
DONALD H. MITCHELL.
HARRY N. SNOOK.

REFERENCES CITED

The following references are of record in the file of this patent:

UNITED STATES PATENTS

| Number | Name | Date |
|---|---|---|
| 1,985,007 | Ashworth | Dec. 18, 1934 |
| 2,389,692 | Sherwin | Nov. 27, 1945 |
| 2,393,977 | Dawson et al. | Feb. 5, 1946 |
| 2,402,108 | Willard | June 11, 1946 |
| 2,405,568 | Ferrill, Jr. | Aug. 13, 1946 |